March 17, 1931.   E. G. GUNN   1,797,061
STEERING GEAR
Filed Aug. 31, 1928
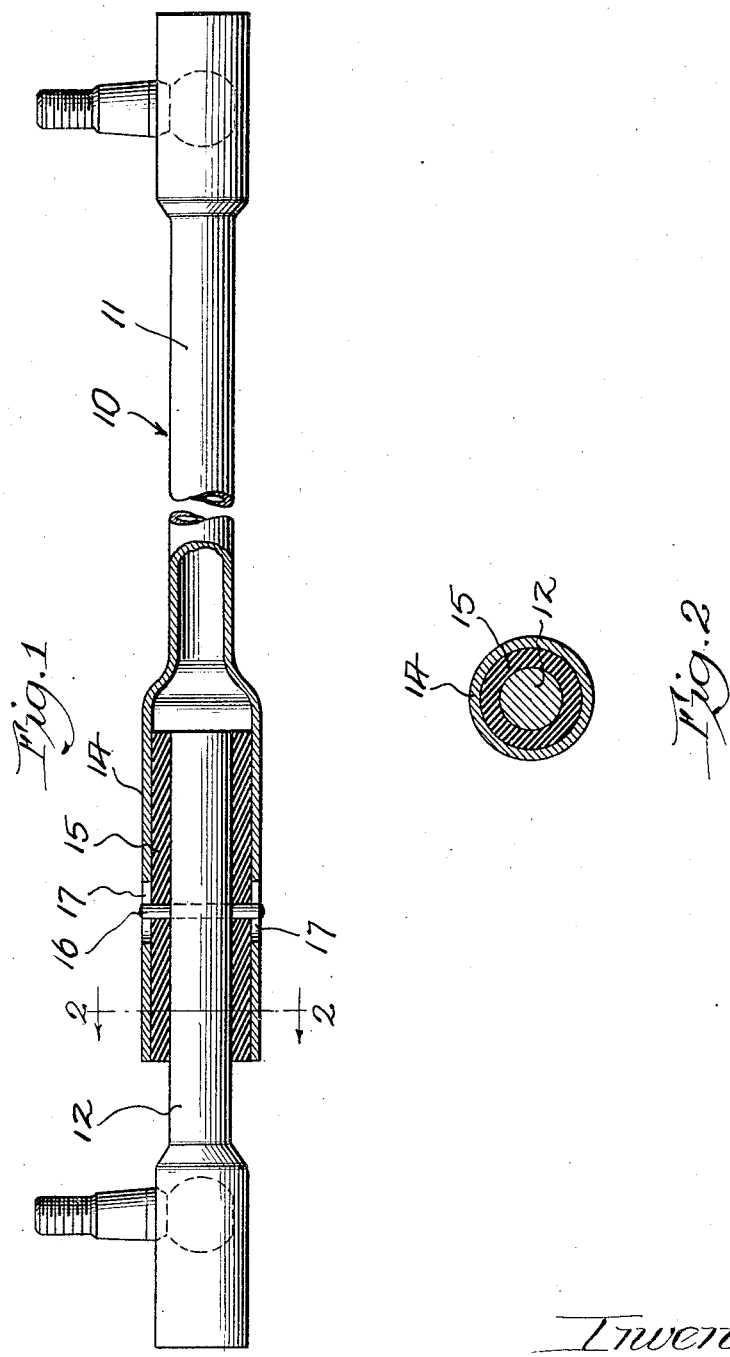
Witness:
Chas. R. Koursh.
Inventor,
Earl G. Gunn Patented Mar. 17, 1931

1,797,061

UNITED STATES PATENT OFFICE

EARL G. GUNN, OF RACINE, WISCONSIN, ASSIGNOR TO THE NASH MOTORS COMPANY, OF KENOSHA, WISCONSIN, A CORPORATION OF MARYLAND

STEERING GEAR

Application filed August 31, 1928. Serial No. 303,163.

This invention relates to improvements in steering gear for automobiles and the like, and more particularly to so-called shock dampeners used in connection therewith, and has for its principal object to provide a new and improved construction thereof whereby excessive shocks and disturbances or "flickering" in the steering system caused by deflection of the supporting springs on the front axle is minimized.

In present automobile constructions wherein the front wheels themselves are of relatively massive construction and often include front wheel brake mechanism, a large proportion of the flickering movements are transferred to the hand steering wheel, whereby they are especially objectionable to the driver.

In order to minimize such movements, some constructions including coil spring cushioning devices have been introduced in the connecting members of the steering gear, as for instance, in the tie rod, so as to permit limited lengthening or shortening of the normal length thereof. Such constructions, while more or less effective, are objectionable for the reason that the springs must be relatively heavy in order to stand up under heavy usage and constant movement, and in consequence, only a small degree of flexibility is possible.

My present invention affords an improved and simplified form of dampener or shock absorbing joint for the purpose.

In carrying out my invention, I utilize a flexible rubber connection between adjacent connecting members so as to introduce a shearing stress in the body of the rubber and thus take advantage of the relatively great flexibility or elasticity of the rubber under initial or small loads and a relatively greater resistance to movement as the load increases. Thus the flexibility of the connection under relatively small loads or shocks is considerably greater than is possible with springs or the like heretofore employed for a similar purpose.

The invention is best illustrated by reference to the accompanying drawings, in which Figure 1 shows a tie rod to which my invention is applied, with the flexible joint shown in cross section.

Figure 2 is a section taken on line 2—2 of Figure 1.

Referring to details shown in the drawings, the tie rod is indicated at 10 and includes a tubular section 11 connected to another cylindrical section 12 by means of a flexible joint or dampener which will now be described.

The tubular section 10 has an enlarged cylindrical open end portion 14 within which the other end portion 12 extends. A sleeve 15 of rubber is inserted between the center portion 12 and the cylindrical enlargement 14. The rubber sleeve may be vulcanized in place in a manner well known in the art so as to be rigidly connected to both metallic parts.

The construction above described provides a flexible connection between parts 11 and 12 so as to dampen the effect of endwise thrusts between the two ends of the tie rod. As already suggested, the relatively large initial elasticity of the rubber is utilized to afford a comparatively large initial deflection of the two parts, but as the load is increased, the limit of elasticity may be reached so as to limit further deflection or displacement of the two parts.

When in operation, the rubber sleeve 15 is yieldable throughout its length under shearing stresses, and therefore provides an extremely simple and economical construction for the metallic parts including the open-ended cylindrical portion 14 and the rod 12.

As a safety measure, I provide suitable auxiliary stop means, as for instance, a pin 16 which may be passed through the tie rod member 12 and the rubber sleeve 15 so as to extend into longitudinally disposed slots 17—17 formed in the side walls of the enlarged portion 14. It will be understood, however, that the safety pin 16 will not be effective unless the rubber sleeve 15 should become damaged or displaced.

Although in the embodiment illustrated my invention is shown as applied to a tie rod, it will be understood that a similar construction might also be utilized in other connecting members of the steering system, as for instance, the drag link.

I claim as my invention:

1. In a steering gear and in combination with two pivoted steering wheels, a connecting member for said wheels including a rod, a rubber sleeve on said rod, and a hollow open-ended member surrounding said rubber sleeve, said sleeve affording limited longitudinal movement of said rod and hollow member under shearing stresses.

2. In a steering gear and in combination with two pivoted steering wheels, a connecting member for said wheels including a rod, a hollow member surrounding said rod, and a rubber sleeve between and vulcanized to said rod and hollow member and affording limited longitudinal movement therebetween under shearing stresses.

Signed at Chicago, Ill., this 23rd day of August, 1928.

EARL G. GUNN.